United States Patent
Neale et al.

(10) Patent No.: US 6,209,943 B1
(45) Date of Patent: Apr. 3, 2001

(54) RETRACTABLE AUTOMOTIVE SEAT ASSEMBLY

(75) Inventors: Colin G. Neale, Northville; Eric M. Langensiepen, Beverly Hills, both of MI (US)

(73) Assignee: Magna Interior Systems Inc., Aurora (CA)

( * ) Notice: Subject to any disclaimer, the term of this patent is extended or adjusted under 35 U.S.C. 154(b) by 0 days.

(21) Appl. No.: 09/267,042

(22) Filed: Mar. 12, 1999

Related U.S. Application Data (60) Provisional application No. 60/077,888, filed on Mar. 13, 1998.

(51) Int. Cl.[7] .................................................. B60N 2/02
(52) U.S. Cl. ........................... 296/65.01; 296/65.05; 296/65.16; 296/37.1
(58) Field of Search ........................... 296/65.01, 65.05, 296/65.16, 37.1

(56) References Cited

U.S. PATENT DOCUMENTS

| | | |
|---|---|---|
| 1,894,103 | 1/1933 | Kuenzel . |
| 2,357,729 | 9/1944 | De Fries . |
| 3,431,018 | 3/1969 | Caron . |
| 3,807,790 | 4/1974 | Erard ....................................... 296/66 |
| 4,133,573 | 1/1979 | Zur .......................................... 296/26 |
| 4,609,221 | 9/1986 | Bottcher ............................. 296/65 R |
| 5,195,795 | 3/1993 | Cannera et al. ..................... 296/65.1 |
| 5,269,581 | 12/1993 | Odagaki et al. ....................... 296/66 |
| 6,073,986 | * 6/2000 | Neale et al. ........................... 296/63 |

FOREIGN PATENT DOCUMENTS

| | | |
|---|---|---|
| 19622146 | 12/1997 | (DE) . |
| 0804890 | 11/1997 | (EP) . |
| 2668990 | 11/1990 | (FR) . |
| 2748241 | 11/1997 | (FR) . |

OTHER PUBLICATIONS

PCT International Search Report dated Dec. 7, 1999.

* cited by examiner

*Primary Examiner*—D. Glenn Dayoan
*Assistant Examiner*—Mickki D. Murray
(74) *Attorney, Agent, or Firm*—Howard & Howard (57) ABSTRACT

A retractable automotive seat assembly having a seat back and a seat cushion. The seat assembly is moveable within an interior of a passenger vehicle between an operative position for supporting an occupant and a stowed position with the seat back stored against a headliner of the vehicle and the seat cushion recessed within a floor of the vehicle. The seat back is pivotally mounted to the headliner of the vehicle. A pair of upper retaining latches are mounted to a side wall of the vehicle for securing the seat back in a roof storing position disposed above the seat cushion and adjacent the headliner. A pair of lower retaining latches are mounted to the side wall of the vehicle below the upper retaining latches for securing the seat back in a seat back operative position abutting at least a portion of the seat cushion. A pair of seat cushion brackets are mounted to the seat cushion for supporting and pivoting the seat cushion independently from the seat back between a seat cushion operative position and a floor storing position with the seat cushion pivoting downwardly into a cavity recessed within the floor of the vehicle. The seat cushion also includes a pair of seat cushion retaining latches for securing the seat cushion in the seat cushion operative position.

30 Claims, 8 Drawing Sheets

RETRACTABLE AUTOMOTIVE SEAT ASSEMBLY

RELATED APPLICATION

This patent application claims priority to and all the benefits of U.S. Provisional Patent Application Ser. No. 60/077,888, filed on Mar. 13, 1998 and entitled "Split Swing Seat".

BACKGROUND OF THE INVENTION

1) Technical Field

The subject invention relates to an automotive seat assembly which is retractable and stored within an interior space of a passenger vehicle.

2) Description of the Prior Art

Removable seat assemblies for automotive vehicles and the like are well known in the art. As appreciated, cargo space in a rear compartment of the vehicle can be maximized by removing the seat assembly. The removable seat is typically a third row bench type seat which is removed from the vehicle through a rear opening in the vehicle. The prior art removable seats have four locking points which secure the seat to a floor of the vehicle. The locking points are usually latch assemblies mounted to a seat riser on the seat assembly which lock into a pin recessed within the floor. Some of the removable seats include wheels or rollers for assisting in removing the seat from the vehicle. These prior art removable seat assemblies work relatively well when space and/or weight constraints are not a primary concern. The primary deficiencies with these seat assemblies relates to the size and weight of the seats. These removable seats can weigh up to 115 pounds which can create great difficulty in removing the seat from the vehicle. Also, the recessed pins create a cavity within the floor which may cause any number of problems for a user of the vehicle.

One solution contemplated by the prior art is to have a retractable seat assembly which stows the entire seat within a cavity in the floor of the vehicle. There are a number of deficiencies with these known retractable seats. One such deficiency is that the seat assembly must include a relatively complicated retracting mechanism in order to move the seat assembly between a seating and a retracted position. Also the cavity within the floor must be of considerable size and depth in order to accommodate the entire seat assembly along with the retracting mechanism. Finally, these prior art retractable seats typically have thin, unattractive and uncomfortable seating surfaces.

Another contemplated solution is to have the seat back portion of the seat assembly stow against a roof or rear window of the vehicle with the seat cushion remaining stationary or flipping forward to a vertical position. These known retractable seats also suffer from a number of deficiencies such as not having adequate retaining latches to secure the seat back and seat cushion and the seat cushion is not completely stowed away within the vehicle.

SUMMARY OF THE INVENTION AND ADVANTAGES

A retractable automotive seat assembly moveable within an interior of a vehicle. The seat assembly comprises a seat cushion and a seat back pivotable between a seat back operative position with at least a portion of the seat back abutting the seat cushion and a roof storing position with the seat back disposed above the seat cushion. At least one upper retaining latch is mounted to the interior of the vehicle for securing the seat back in the roof storing position disposed above the seat cushion. At least one lower retaining latch is mounted to the interior of the vehicle below the upper retaining latch for securing the seat back in the seat back operative position abutting at least a portion of the seat cushion.

More specifically, the retractable automotive seat assembly is moveable within the interior of the vehicle between an operative position for supporting an occupant and a stowed position partially stored against a headliner of the vehicle and partially recessed within a floor of the vehicle. The seat back is pivotally mounted to the headliner of the vehicle for movement between the seat back operative position and the roof storing position with the seat back disposed above the seat cushion adjacent the headliner. At least one seat cushion bracket is mounted to the seat cushion for supporting and pivoting the seat cushion independently from the seat back between a seat cushion operative position with at least a portion of the seat cushion abutting the seat back when the seat back is in the seat back operative position and a floor storing position with the seat cushion pivoting downwardly recessed within the floor of the vehicle.

Accordingly, the present invention incorporates a completely retractable seat assembly wherein the seat back is locked into both the seating and stowed positions and the seat cushion is independently stowed within a cavity in the vehicle floor. The subject seat assembly maximizes the available cargo space in the vehicle without having to remove the entire seat assembly from the vehicle. The lightweight and sturdy construction of the seat assembly allows safe and easy storage of the seat assembly while being commensurate with good safety practices.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
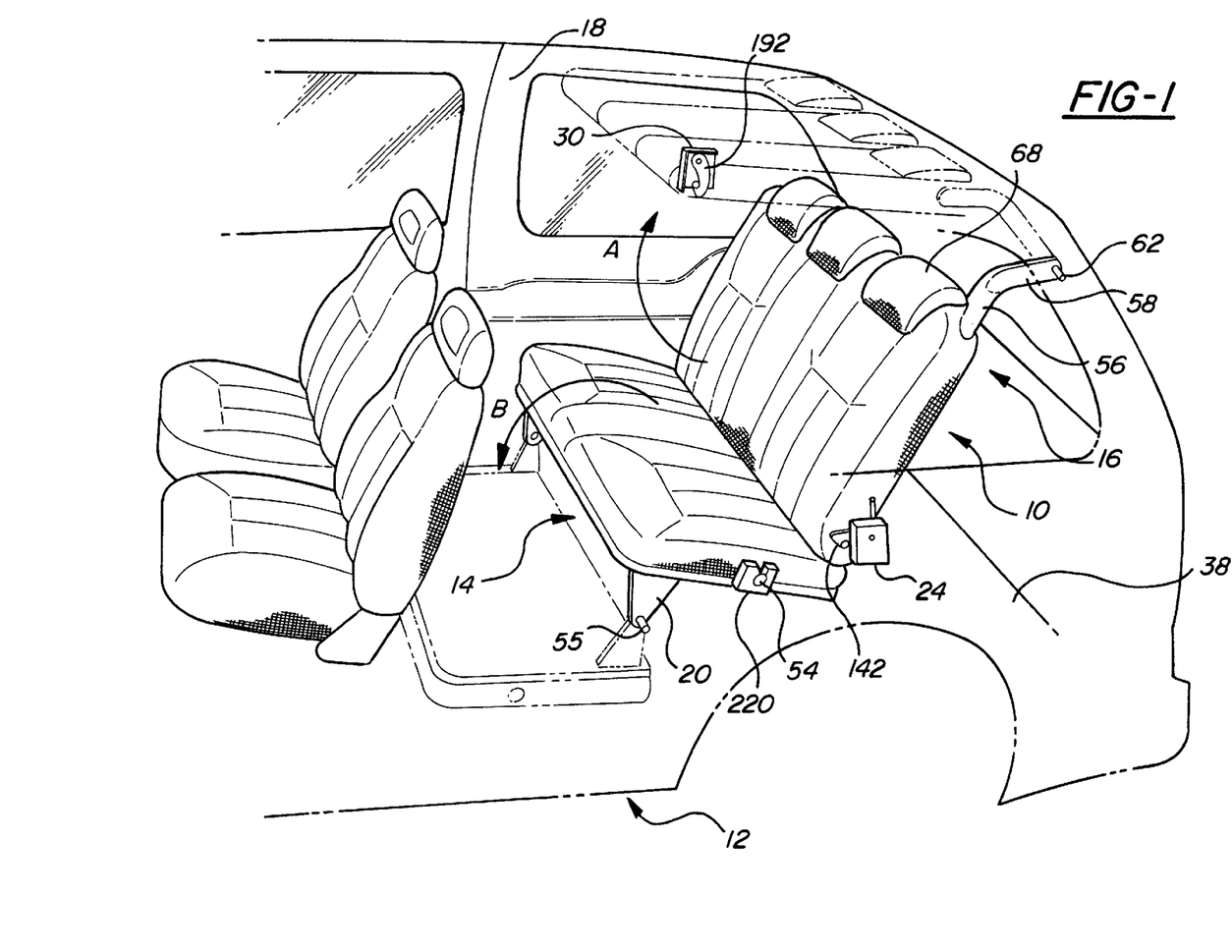
FIG. 1 is a perspective view illustrating a split swing seat assembly of the subject invention in a rear of a passenger vehicle.
Figure 2:
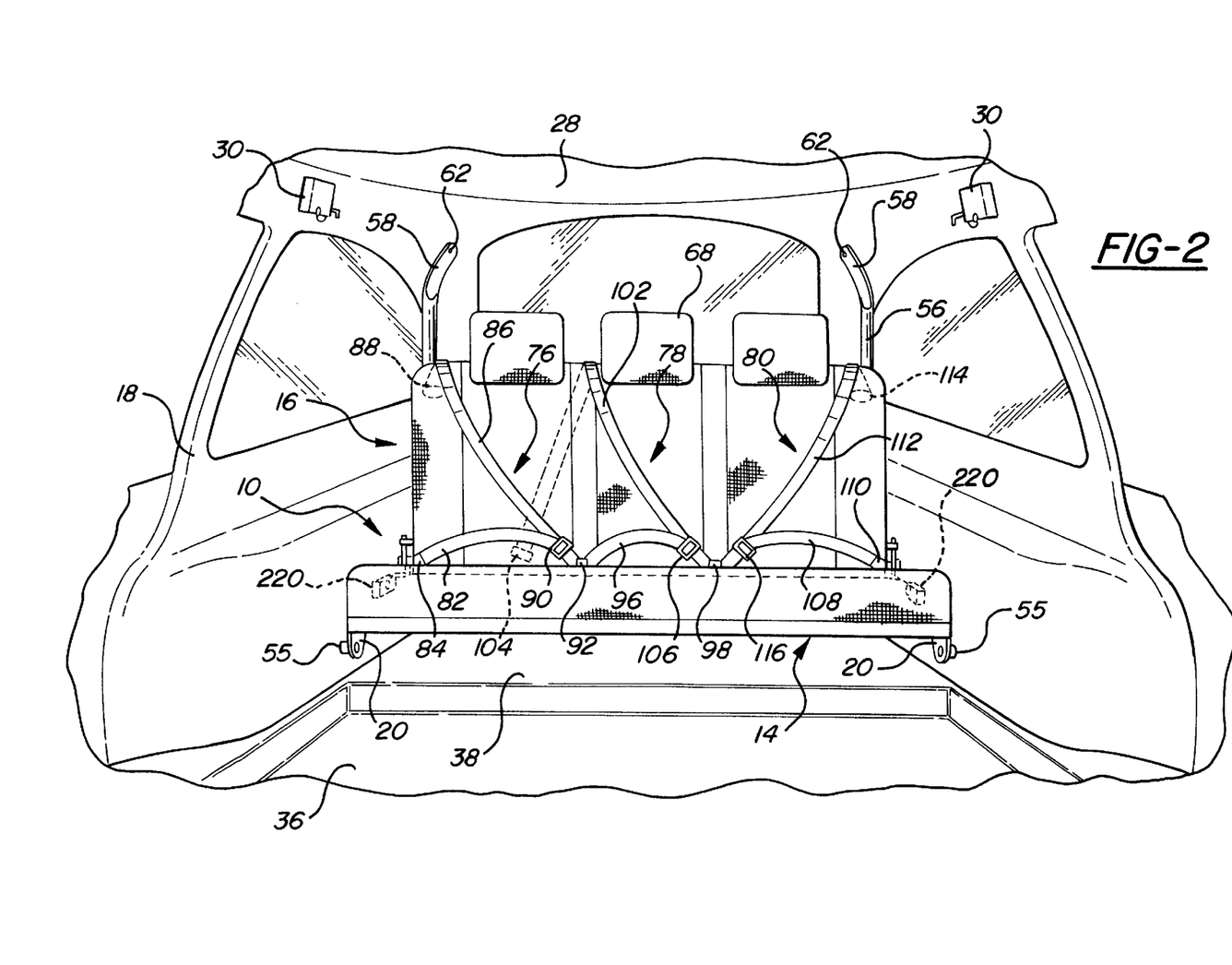
FIG. 2 is a fragmentary perspective view of an inside of the vehicle incorporating the seat assembly in an operative position.
Figure 3:
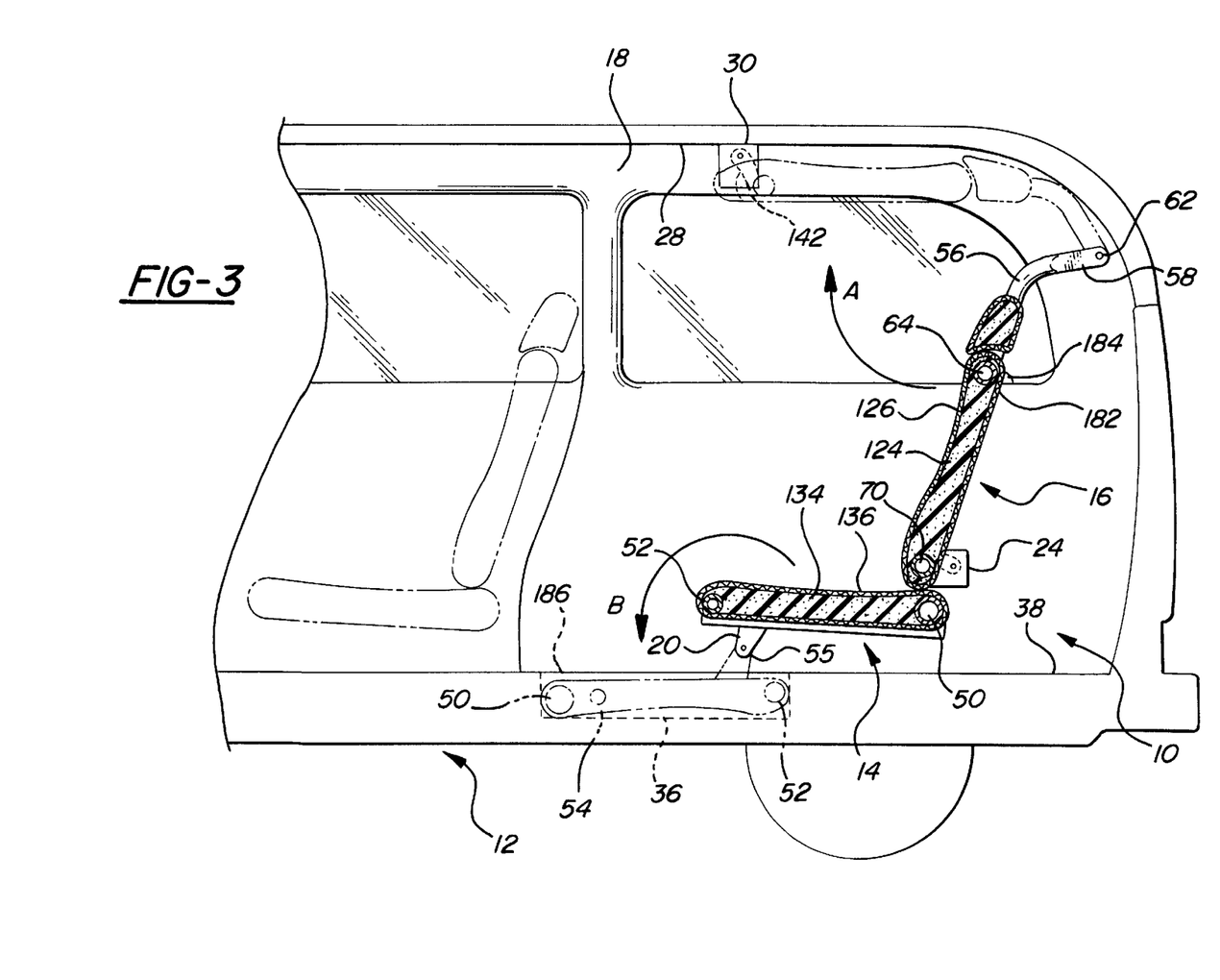
FIG. 3 is a partially cross-sectional side view of the seat assembly within the vehicle.

Referring to the Figures, wherein like numerals indicate like or corresponding parts throughout the several views, a retractable automotive seat assembly is generally indicated at 10 in FIGS. 1 through 3. The seat assembly 10 is moveable within an interior of a passenger vehicle 12. Specifically, the seat assembly 10 moves within the interior of the vehicle 12 between an operative position supporting an occupant and a stowed position partially stored against a headliner 28 of the vehicle 12 and partially recessed within a floor 38 of the vehicle 12. The passenger vehicle 12 may be any suitable type of vehicle such as a mini-van, conversion van or sport utility vehicle. The vehicle 12 shown includes interior side walls 18, the floor 38 and the headliner or roof 28. The seat assembly 10 includes a seat cushion assembly, generally indicated at 14, and a seat back assembly, generally indicated at 16.

In accordance with the principles of the present invention, the seat back assembly 16 and the seat cushion assembly 14 are constructed and arranged to be separable from each other. The seat back assembly 16 is pivotally mounted to an upper portion of the side walls 18 of the vehicle 12. The seat cushion assembly 14 is pivotally mounted to the floor 38 of the vehicle 12 by pivotally connected seat cushion brackets 20.

According to the present invention the seat back assembly 16 is pivotable between a seat back operative position with at least a portion of the seat back assembly 16 abutting the seat cushion assembly 14 and a roof storing position with the seat back assembly 16 disposed above the seat cushion assembly 14. Specifically, the seat back assembly 16 is retained in the seat back operative position by lower retaining latches 24 fixed to the side walls 18 of the vehicle 12. As shown in FIGS. 1 and 3, the seat back assembly 16 can be swung upwards in the direction indicated by arrow A to the roof storing position on the roof 28 of the vehicle 12. The seat back assembly 16 is pivotally mounted to the headliner or roof 28 of the vehicle 12 such that the seat back assembly 16 is disposed adjacent the headliner 28 when in the roof storing position. The seat back assembly 16 is retained in the roof storing position by upper retaining latches 30 fixed to the upper portions of the side wall 18 of the vehicle 12. For illustrative purposes, the upper 30 and lower 24 retaining latches are shown schematically or hidden in FIGS. 1,2,3 and 5. The retaining latches 24, 30 will be discussed in greater detail below with reference to FIGS. 7 through 10.

The seat cushion assembly 14 is held in a seat cushion operative position by a bottom of the seat back assembly 16. When the seat back assembly 16 is swung upwards from the seat back operative position to the roof storing position, the seat cushion assembly 14 can be pivoted on the pivotally connected seat brackets 20 in a direction indicated by arrow B to a floor storing position in a floor storage area 36 in the vehicle floor 38. The brackets 20 are shown in a generic form in the Figures. As appreciated, the brackets 20 are preferably double hinged such that the seat cushion assembly 14 does not interfere with the brackets 20 when pivoted to the floor storing position. As also appreciated, the entire thickness of the seat cushion assembly 14 must equate to the size and depth of the floor storage area 36. For illustrative purposes, the seat back assembly 16 and seat cushion assembly 14 are shown in solid lines when in the operative positions and shown in phantom lines when in the storage positions.

Accordingly, the method of retracting the automotive seat assembly 10 within the interior of the vehicle 12 between the operative position for supporting the occupant and the stowed position partially stored against the headliner 28 of the vehicle 12 and partially recessed within the floor 38 of the vehicle 12 comprises the steps of: pivoting the seat back assembly 16 between the seat back operative position with at least a portion of the seat back assembly 16 abutting the seat cushion assembly 14 and the roof storing position with the seat back assembly 16 disposed above the seat cushion assembly 14 and adjacent the headliner 28; and pivoting the seat cushion assembly 14 independently from the seat back assembly 16 between the seat cushion operative position, with at least a portion of the seat cushion assembly 14 abutting the seat back assembly 16 when the seat back assembly 16 is in the seat back operative position, and the floor storing position with the seat cushion assembly pivoting downwardly and recessed within the floor 38 of the vehicle 12.

The pivoting of the seat cushion assembly 14 is further defined by pivoting the seat cushion assembly 14 from the seat cushion operative position 180° to the floor storing position which substantially positions the seat cushion assembly 14 upside down within the floor 38 of the vehicle 12.

In view of the roof storing position of the seat back assembly 16 and the pivoting movement of the seat cushion 14 and seat back 16 assemblies it is highly desirable to reduce the weight of the seat back assembly 16 and the seat cushion assembly 14 as much as possible commensurate with good safety and comfort practices. Also, because the seat assembly 10 is to be utilized in a passenger vehicle 12, it is preferably sized to accommodate three occupants in a side-by-side relationship. As appreciated, the seat assembly 10 may be a single passenger seat of any suitable size. Finally, because the seat assembly 10 is separable into a seat back assembly 16 and a seat cushion assembly 14, it is contemplated that seat belt assemblies are carried by the seat back assembly 16.

Figure 4:
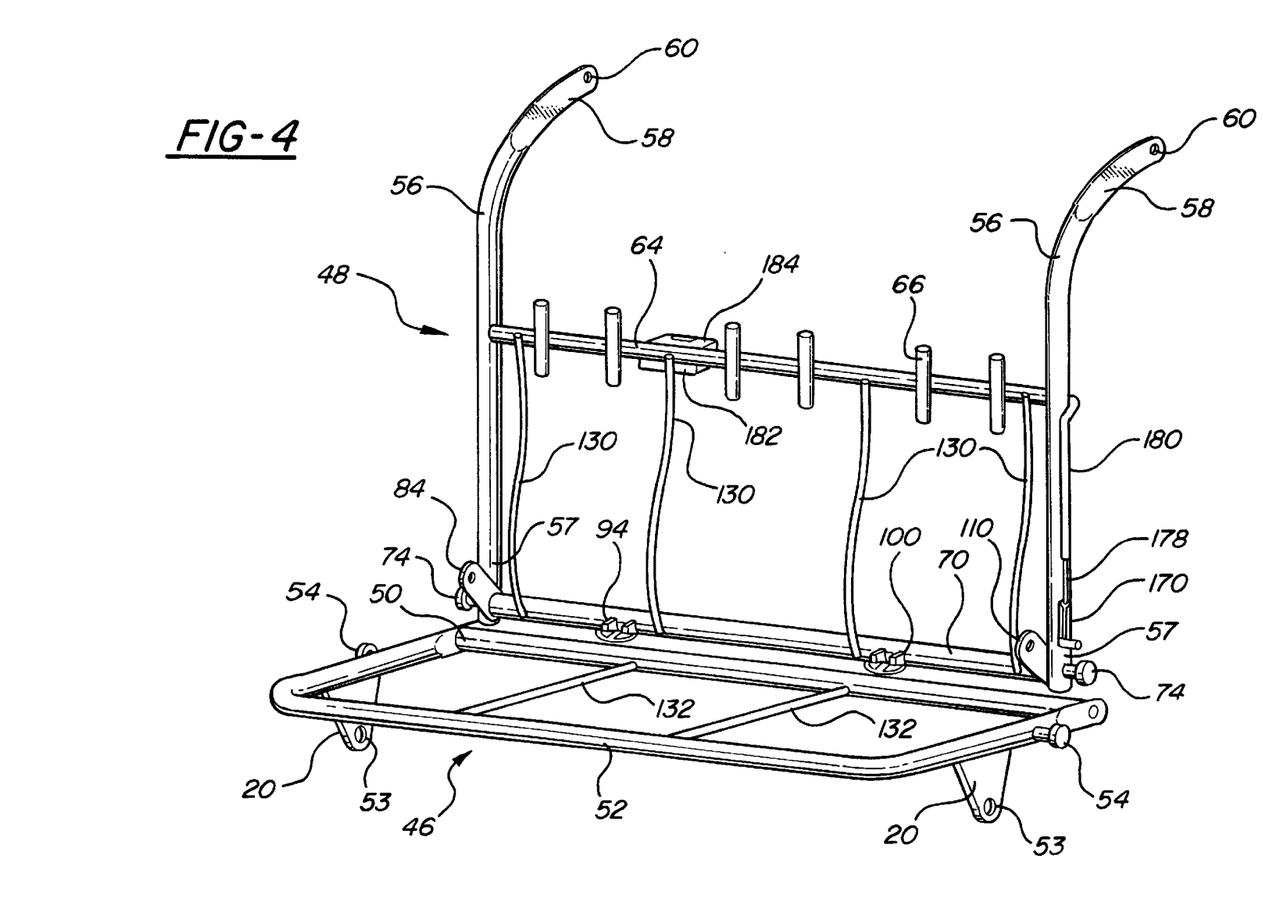
FIG. 4 is a perspective view of a seat frame assembly embodying the principles of the present invention.

Referring to FIG. 4 the seat cushion assembly 14 includes a seat cushion frame assembly 46. The seat cushion frame assembly 46 has a generally rectangular shape defined by a rear horizontal frame member 50 and a U-shaped frame member 52 extending from opposite ends thereof. Restraining pins 54 extend outwardly from opposite sides of the U-shaped frame member 52.

The pivotally connected seat cushion brackets 20 are fixed by welding or other similar fixing means to opposite sides of the U-shaped frame member 52. The brackets 20 support and pivot the seat cushion assembly 14 independently from the seat back assembly 16 between the seat cushion operative position and the floor storing position with the seat cushion assembly 14 pivoting downwardly to a stowed position within the vehicle 12. The seat cushion brackets 20 have apertures 53 configured to receive pivot pins 55, shown in FIGS. 1–3 and 5, extending inwardly from the walls 18 of the vehicle 12. The pivotally connected seat cushion brackets 20 allow the seat cushion assembly 14 to pivot about the pins 55 from the seat cushion operative position to the floor storing position.

The seat back assembly 16 includes a seat back frame 48 having a pair of transversely spaced side frame members 56. The side frame members 56 have a tubular construction with an upper portion 58 of each being flattened so as to enable mounting holes 60 to be bored through the upper portions 58. The mounting holes 60 are configured to receive pivot pins 62, shown in FIGS. 1,2,3 and 5. The pivot pins 62 extend inward from the side walls 18 of the vehicle 12 near the roof 28 so as to enable the seat back assembly 16 to be swung upward about the pivot pins 62 from the seat back operative position to the roof storing position adjacent the headliner 28 of the vehicle 12.

Figure 6:
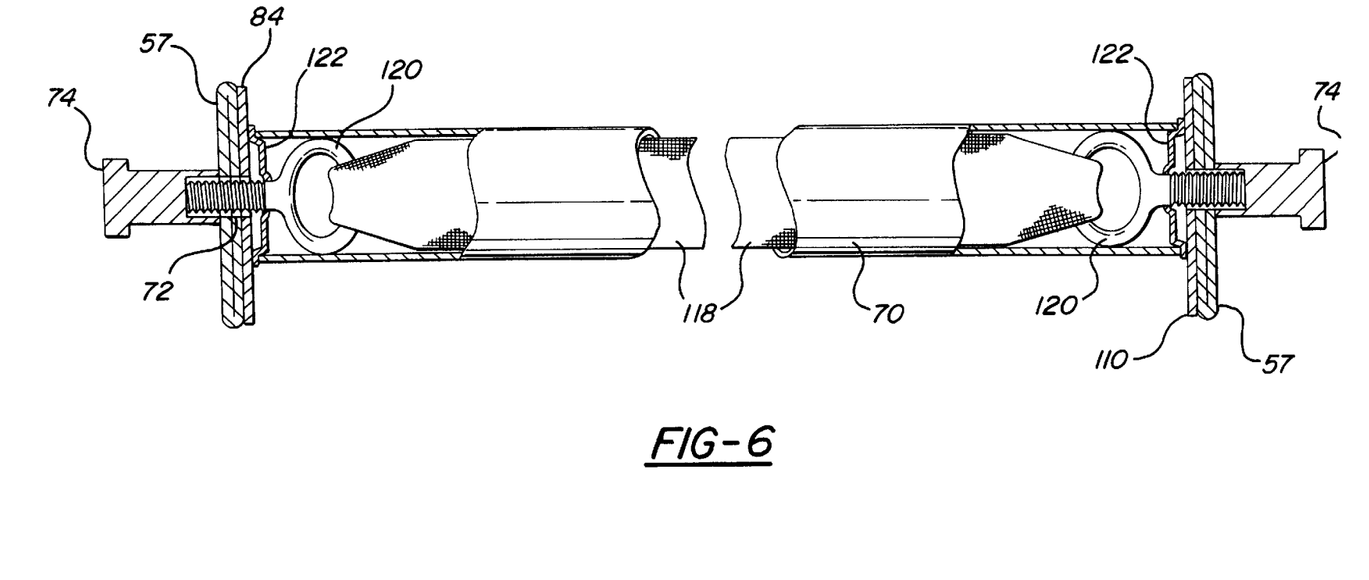
FIG. 6 is a partially cross-sectional view of a lower horizontal frame member of the frame assembly shown in FIG. 3.

Extending between and fixed to middle portions of the side frame members 56 is an upper horizontal frame member 64. The upper frame member 64 carries a series of tubes 66 for adjustably receiving a pair of headrests 68. Extending between and fixed to a lower portion 57 of the side frame members 56 is a lower horizontal frame member 70 which will be discussed in detail below. The lower portions 57 of the side frame members 56 are flattened so that a latch pin hole 72 may be bored therethrough as shown in FIG. 6. The latch pin holes 72 are designed to fix the side frame members 56 to the lower horizontal frame member 70 by means of anchor pins 74. The anchor pins 74 extend from each end of the lower horizontal frame member 70 for selective engagement with the upper 30 and lower 24 retaining latches.

As is best shown in FIG. 2, the seat assembly 10 includes three separate seat belt assemblies, generally indicated at 76,78,80. The seat belt assemblies 76, 78, 80 are of conventional constructions. A right seat belt assembly 76 includes a lap belt 82 which is suitably fixed at one end to a connecting member 84. The connecting member 84 is secured to the right side of the lower horizontal frame member 70 inside of the side frame member 56 by the anchor pin 74. The opposite end of the lap belt 82 is connected with one end of a shoulder belt 86 which extends from a reel assembly 88. The reel assembly 88 is carried by the seat back frame 48 at a position adjacent the juncture of the right side frame member 56 and the upper horizontal frame member 64. The interconnected lap 82 and shoulder 86 belts are provided with a latch element (not shown) which enters a releasable latch receiver 90 with a short belt which is fixed to a connecting member 92. The connecting member 92 is fixed to a belt bracket 94. The belt bracket 94 is secured to the lower horizontal frame member 70 by welding or other suitable securing means at a position spaced from the right end of the frame member 70 as shown in FIG. 4.

Similarly, a central or middle seat belt assembly 78 includes a lap belt 96 which is fixed at one end to the aforementioned connecting member 92. As discussed before, the connecting member 92 is connected to the belt bracket 94. The lap belt 96 has its opposite end connected with a shoulder belt 102 which extends over the seat back assembly 16 and the upper horizontal frame member 64 and downward to a reel assembly 104. The reel assembly 104 is secured to the lower horizontal frame member 70 by welding or other suitable securing means. As before, the interconnected lap 96 and shoulder 102 belts are provided with a latch element (not shown) operable to enter a latch receiver 106. The latch receiver 106 has a short belt suitably fixed to a connecting member 98. The connecting member 98 connects to a belt bracket 100. The belt bracket 100 is secured by welding or other suitable securing means to the lower horizontal frame member 70 at a position spaced between the left end of the frame member 70 and the other belt bracket 94 as shown in FIG. 4.

Finally, the left seat belt assembly 80 includes a lap belt 108 fixed at one end to a connecting member 110. The connecting member 110 is secured to the left side of the lower horizontal frame member 70 inside of the side frame member 56 by the anchor pin 74. The opposite end of the lap belt 108 is connected to one end of a shoulder belt 112 which extends from a reel assembly 114. The reel assembly 114 is fixed to the seat back frame 48 at the juncture between the left side frame member 56 and the upper horizontal frame member 64. As before, the interconnected shoulder 112 and lap 108 belts are provided with a latch element (not shown) which enters a releasable latch receiver 116. The latch receiver 116 has a short belt which is suitably fixed to the connecting member 98. As discussed before, connecting member 98 is connected to belt bracket 100. Optionally, the shoulder belt 102 of the middle belt assembly 78 may be eliminated. Also, it is contemplated that the reel assemblies 88, 114 of the right and left seat belt assemblies 76, 80 may be secured to the side walls 18 of the vehicle 12 rather at the junctures of the side frame members 56 and the upper horizontal frame member 64.

In the event of an accident such as a head-on collision, the forward thrust of the seat occupants is resisted by the seat belt assemblies 76,78,80. The force imposed on the seat belt assemblies 76,78,80 by the forward thrust of the occupants is transmitted to the connecting members 84,92,98,110. The forces transmitted to the connecting members 92 and 98 in particular will cause the lower horizontal frame member 70 to bend in a forward direction.

Instead of providing the lower horizontal frame member 70 with a thicker wall and the added weight thereof to resist this bending action, a tensile element 118 is mounted within the interior of the lower horizontal frame member 70. Specifically, the lower horizontal frame member 70 is in the shape of a hollow tube and the tensile element 118 is disposed within and in parallel with the hollow tube and extending between opposite ends of the hollow tube thereby limiting bending of the lower horizontal frame member 70 in response to the seat belt loads by acting in tension. As best shown in FIG. 6, the tensile element 118 is in the form of a belt having a construction like a seat belt. It will be understood that other tensile elements may be utilized such as cables and the like. The seat belt type tensile element 118 is preferred because of its strength to weight ratio. Under a stress condition where bending forces are applied to the lower horizontal frame member 70, the bending stresses are resisted by the tensile forces which build up in the tensile element 118. The tensile forces that build up in the tensile element 118 are transmitted to eye bolts 120 and the anchor pins 74. The anchor pins 74 are retained in lower retaining latches 24 which are fixed to the side walls 18 of the passenger vehicle 12. The anchor pins 74 in turn transmit the tensile forces to the lower retaining latches 24 and the side walls 18 of the vehicle 12. This resistance to the bending stresses provides the necessary strength to resist the peak load conditions with a construction which is considerably lighter in terms of overall weight than a simple tubular member with a thicker wall having the same resistance. The specifics of the tensile element 118 and its operation also form the subject matter of an independent invention disclosed and claimed in co-pending application Ser. No. 09/205,759 filed on Dec. 4, 1998 and assigned to the assignee hereof.

Referring back to FIG. 3, the seat back assembly 16 includes, in conjunction with the seat back frame 48, a lightweight foam pad 124 covered with a suitable trim cover 126. To enable the foam pad 124 and the trim cover 126 to be minimized in bulk and weight, a seat back suspension membrane (not shown), preferably made of a fabric material, may be fixed between the side frame members 56 and the upper and lower horizontal frame members 64, 70. As shown in FIG. 4, four spring-like elongated stabilizing elements 130 are mounted between the upper and lower horizontal frame members 64, 70 to aid in the support of the foam pad 124. Similarly, a suspension membrane (not shown) may be mounted on the seat cushion frame 46 between the rear horizontal frame member 50 and the U-shaped frame member 52. The seat cushion assembly 14 includes a lightweight foam pad 134 suitably covered by a trim cover 136. Also, a pair of stabilizing elements 132 are provided between the rear horizontal frame member 50 and the U-shaped frame member 52 to aid in support of the foam pad 134. The stabilizing elements 132 may be contoured in a similar fashion as the stabilizing elements 130 of the seat back frame 48.

Figure 7:
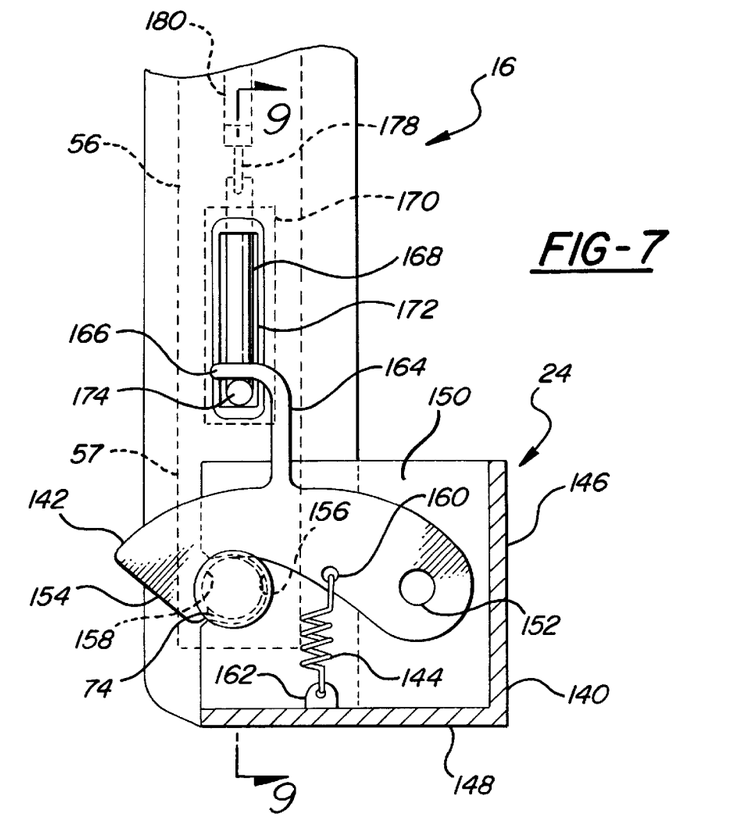
FIG. 7 is a partially cross-sectional side view of a lower retaining latch for retaining a seat back assembly of the split swing seat assembly in the operative position.

Referring now more particularly to FIGS. 1,3,5,7, and 9, the seat back assembly 16 is retained in the seat back operative position by the lower retaining latches 24. As appreciated, the lower retaining latches 24 may be mounted to a wheel house structure, the side walls 18 or any other appropriate portion of the vehicle 12. As shown in FIG. 7, each lower retaining latch 24 comprises a latch housing 140 fixedly attached to the wall 18, a latch member 142, and a biasing member 144. The latch housing 140 has a vertical wall 146 and a horizontal wall 148 formed continuously together and extending inwardly from the side wall 18. A housing plate 150 formed continuously with both the vertical 146 and the horizontal walls 148 extends from the vertical wall 146 along the length of the horizontal wall 148 spaced parallel to the vehicle side wall 18. The latch member 142 is pivotally mounted in the latch housing 140 on a pivot pin 152 inserted through an aperture in the latch member 142.

The latch member 142 has a cam surface 154 opposite the pivot pin 152. The cam surface 154 is disposed outside the latch housing 140 and extends downwardly towards the latch housing 140 at an angle. The latch housing 140 has a C-shaped latch pin receiving slot 156 facing the front of the vehicle 12. A semi-circular latch retaining surface 158 facing the C-shaped latch pin receiving slot 156 is also provided on the latch member 142. One end of the biasing member 144 is fixed to an aperture 160 on the latch member 142 and the other end of the biasing member 144 is fixed to a projection 162 on the horizontal wall 148 of the latch housing 140. The biasing member 144, which is preferably a spring 144, continuously biases the latch member 142 toward a latched position disposed around the anchor pin 74.

An actuating arm 164 extends vertically from the latch member 142 and is bent at a right angle for moving the latch member 142 from the latched position to a release position. An engaging portion 166 of the actuating arm 164 extends generally horizontally towards the front of the vehicle 12. A stopping portion 167 extends generally horizontally and inwardly from the actuating arm 164 and contacts the housing plate 150 to prevent the latch member 142 from falling to the bottom of the latch housing 140. A release actuator 168 is disposed within a guide housing 170. The guide housing 170 is fixedly attached to the outer surface of each side frame member 56. The release actuator 168 selectively engages the actuating arm 164 to lift the actuating arm 164 and move the latch member 142 from the latched position against the bias of the spring 144 to the released position. Specifically, the release actuator 168 is allowed to slide along its longitudinal axis within the guide housing 170. The guide housing 170 has a tubular shaped slot 172 facing outwardly. An engagement portion 174 of the release actuator 168 extends outwardly at a right angle in a generally horizontal direction through the slot 172. The guide housing 170 is configured to restrain all lateral and rotational movement of the release actuator 168, thereby only permitting the release actuator 168 to move along its longitudinal axis. As appreciated, the release actuator 168 may be of any suitable design or configuration so long as the latch member 142 can be effectively actuated.

A cable 178 is attached to the end of the release actuator 168 opposite the engagement portion 174 to operably move the release actuator 168 and pivot the latch member 142 to the release position. As also shown in FIG. 4, the cable 178 is preferably a component of a Bowden wire assembly which further includes a flexible conduit 180, a mounting plate 182, and an actuating handle 184. The mounting plate 182 is fixed to the upper horizontal frame member 64 and the actuating handle 184 is pivotally connected to the mounting plate 182. The handle 184 is located off-center to provide access between the headrests 68. As appreciated, the mounting plate 182 and handle 184 may be mounted to the lower horizontal frame member 70 to facilitate easier release from the stowed position. The flexible conduits 180 extend along the upper frame member 64 and down the side frame members 56 from a position immediately adjacent the mounting plate 182 to a position immediately adjacent the guide housing 170. Cables 178 extend through each conduit 180 and are operatively connected to the actuating handle 184 such that manually operating the handle 184 moves the cables 178 within the conduits 180 and results in movement of the release actuator 168 along their longitudinal axes.

As the seat back assembly 16 swings down from the roof storing position to the seat back operative position, the anchor pins 74 contact the cam surfaces 154 and the latch members 142 are displaced from the latch pin receiving slots 156 and the anchor pins 74 are received therein. When the anchor pins 74 are received in the latch pin receiving slots 156, the anchor pins 74 no longer contact the cam surfaces 154 of the latch members 142 and the springs 144 bias the latch members 142 into an engaged position with the latch retaining surfaces 158 retaining the anchor pins 74 in the latch pin receiving slots 156. Also, the engagement portion 174 of the release actuator 168 is disposed immediately below the engaging portion 166 of the actuating arm 164.

To move the seat back assembly 16 from the seat back operative position to the roof storing operative position, the actuating handle 184 is manually operated resulting in upward movement of the release actuators 168 along their longitudinal axes. The upward movement of the release actuators 168 causes the engagement portion 174 of the release actuators 168 to engage the engaging portion 166 of the actuating arm 164 in a lifting relation, thereby moving the latch member 142 out of the engaged position and allowing the anchor pins 74 to be moved freely from the latch receiving slots 156. Thus, the seat back assembly 16 can then be moved out of the seat back operative position and can be swung upwards to the roof storing position. When the seat back assembly 16 is in the roof storing position, the seat cushion assembly 14 can then be swung from the seat cushion operative position to the floor storing position within the floor storage area 36.

Referring now more particularly to FIGS. 1,2,5,8, and 10, the seat back assembly 16 is retained in the roof storage position by the upper retaining latches 30. Each upper retaining latch 30 comprises a latch housing 190 fixedly attached to upper portions of the wall 18, a latch member 192, and a biasing member 194. The latch housing 190 has a vertical wall 196 and a horizontal wall 198 formed continuously together and extending inwardly from the vehicle side wall 18. A housing plate 200 spaced parallel to the side wall 18 and formed continuously with both the vertical 196 and the horizontal walls 198 extends from the vertical wall 196 along the length of the horizontal wall 198. The latch member 192 is pivotally mounted in the latch housing 190 on a pivot pin 202 inserted through an aperture in the latch member 192.

Figure 8:
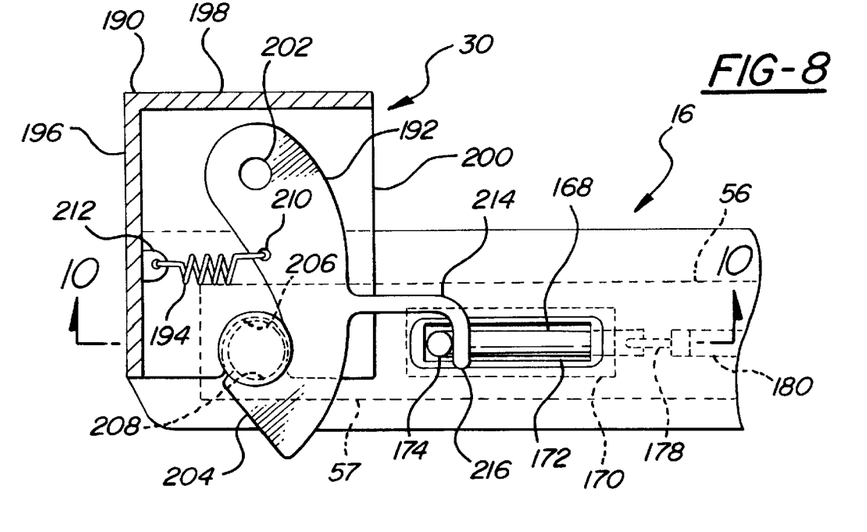
FIG. 8 is a partially cross-sectional side view of an upper retaining latch for retaining the seat back assembly in the stored position.
Figure 9:
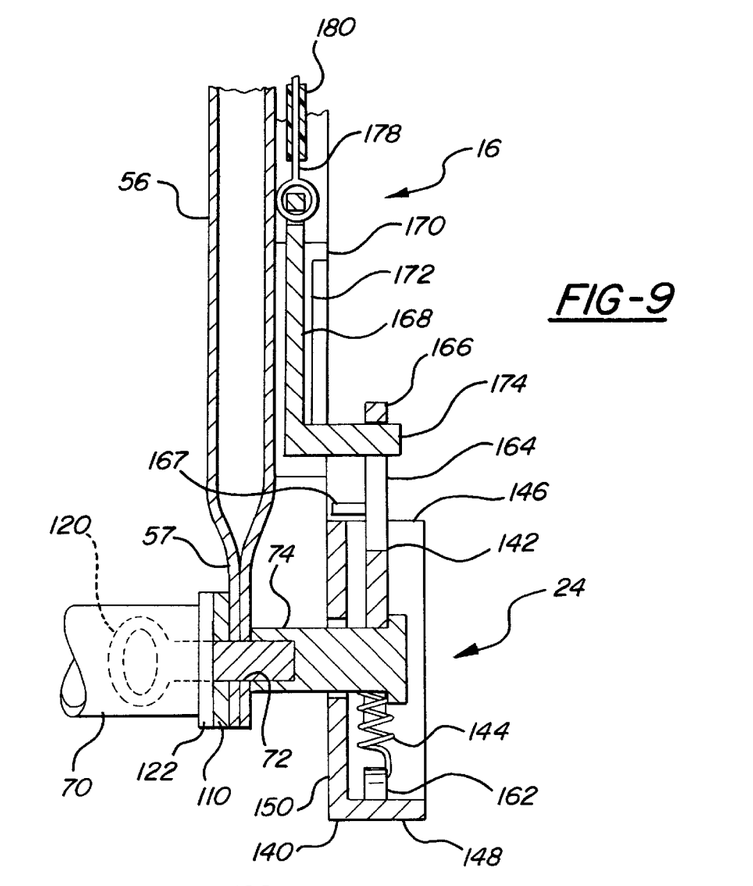
FIG. 9 is a cross-sectional view taken along line 9—9 of FIG. 7.

The latch member has a cam surface 204 opposite the pivot pin 202. The cam surface 204 is disposed outside the latch housing 190 and extends upwardly towards the latch housing 190 at an angle. The latch housing 190 has a C-shaped latch pin receiving slot 206 facing downwards. A semi-circular latch retaining surface 208 facing the C-shaped latch pin receiving slot 206 is also provided on the latch member 192. One end of the biasing member 194 is fixed to an aperture 210 on the latch member 192 and the other end of the biasing member 194 is fixed to a projection 212 on the vertical wall 196 of the latch housing 190. The biasing member 194, which is preferably a spring 194, continuously biases the latch member 192 toward a latched position disposed around the anchor pin 74.

Figure 10:
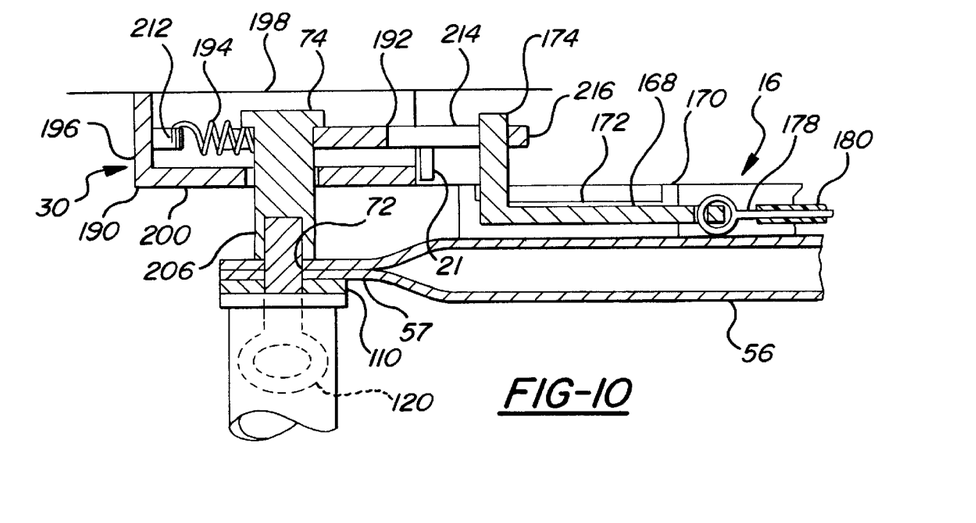
FIG. 10 is a cross-sectional view taken along line 10—10 of FIG. 8.

An actuating arm 214 extends in a generally horizontal direction toward the rear of the vehicle 12 from the latch member 192 and is bent at a right angle for moving the latch member 192 from the latched position to a release position. An engaging portion 216 of the actuating arm 214 extends generally downward. A stopping portion 218, as best seen in FIG. 10, extends inwardly in a generally horizontal direction from the actuating arm 214 and contacts the housing plate 200 to prevent the latch member 192 from pivoting to the front of the latch housing 190. As appreciated, the upper retaining latches 30 are preferably similar to the lower retaining latches 24.

As the seat back assembly 16 swings up to the roof storing position from the seat back operative position, the anchor pins 74 contact the cam surfaces 204 displacing the latch members 192 from the latch pin receiving slots 206 and the anchor pins 74 are received therein. When the anchor pins 74 are received in the latch pin receiving slots 206, the anchor pins 74 no longer contact the cam surfaces 194 of the latch members 192 and the springs 194 bias the latch members 192 into an engaged position with the latch retaining surfaces 208 retaining the anchor pins 74 in the latch pin receiving slot 206. Also, the engagement portion 174 of the release actuator 168 is disposed immediately forward of the engaging portion 206 of the actuating arm 214.

To move the seat back assembly 16 from the roof storing operative position to the seat back operative position, the actuating handle 184 is manually operated resulting in rearward movement of the release actuators 168 along their longitudinal axes. The rearward movement of the release actuators 168 causes the engagement portion 174 of the release actuators 168 to engage the engaging portion 216 of the actuating arm 214 in a pulling relation, thereby moving the latch member 192 out of the engaged position and allowing the anchor pins 74 to be moved freely from the latch receiving slots 206. Thus, the seat back assembly 16 is moved out of the roof storing position and can be swung downwards to the seat back operative position.

Figure 5:
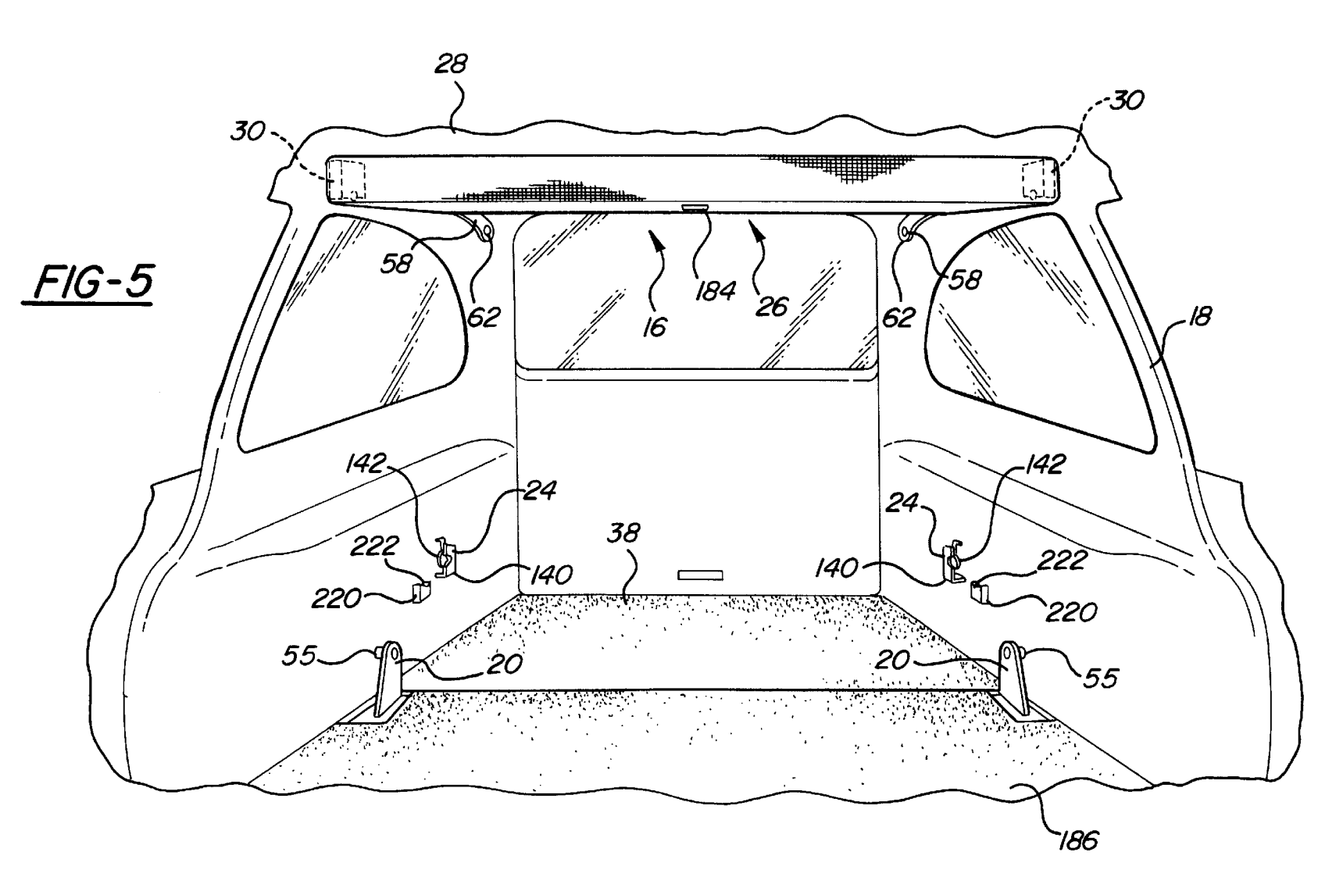
FIG. 5 is a fragmentary perspective view of the inside of the vehicle incorporating the seat assembly in a stored position.

As best shown in FIGS. 2 and 3, a generally rectangular recess sized to receive the seat cushion assembly 14 in the vehicle floor 38 defines the floor storage area 36. A pivotable lid 186, shown in FIGS. 3 and 5, is pivotally fixed to the vehicle floor 38 and allows the floor storage area 36 to be opened and closed. The lid 186 is continuous with the vehicle floor 38 when the floor storage area 36 is closed and has portions cut out of the rear end adjacent each side wall 18 to allow the pivoting seat cushion brackets 20 to extend therefrom. The pivotal lid 186 covers the floor storage area 36 and the seat cushion assembly 14 when the seat cushion assembly 14 is in the floor storing position.

In the seat cushion operative position, the bottom of the seat back assembly 16 holds the rear portion of the seat cushion assembly 14 down, thereby retaining the seat cushion assembly 14 in the operative position. Also, the retaining pins 54 extending from opposite sides of the seat cushion frame 46 and are retained in seat cushion retaining latches 220 fixed to the side walls 18 of the vehicle 12. The seat cushion retaining latches 220 each have a C-shaped opening 222 facing upwards. As the seat cushion assembly 14 is swung from the floor storing position to the seat cushion operative position, the restraining pins 54 fit into the C-shaped openings 222 on the seat cushion retaining latches 220, thereby preventing the seat cushion assembly 14 from moving in the forward and backward directions with respect to the vehicle 12. As appreciated, the seat cushion retaining latches 220 of the seat cushion assembly 14 may be of a similar design to the lower 24 and upper 30 retaining latches or of any other suitable design.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that within the scope of the appended claims the invention may be practiced otherwise than as specifically described.

What is claimed is:

1. A retractable automotive seat assembly moveable within an interior of a vehicle, said assembly comprising;
    a seat cushion;
    a seat back having opposing sides and adapted to be pivotally mounted to the interior of the vehicle, said seat back pivotable between a seat back operative position, with at least a portion of said seat back abutting said seat cushion, and a roof storing position with said seat back disposed above said seat cushion;
    at least one upper retaining latch adapted to be mounted to the interior of the vehicle for securing said seat back in said roof storing position disposed above said seat cushion; and
    at least one lower retaining latch adapted to be mounted to the interior of the vehicle below said upper retaining latch for securing said seat back in said seat back operative position abutting at least a portion of said seat cushion; and
    an anchor pin extending from each of said sides of said seat back for selective engagement with said upper and lower retaining latches.

2. An assembly as set forth in claim 1 wherein said seat back includes a seat back frame supporting a foam pad and having a pair of side frame members interconnected by an upper horizontal frame member and a lower horizontal frame member.

3. An assembly as set forth in claim 2 wherein said side frame members include an upper portion for pivotally mounting said seat back to a headliner of the vehicle.

4. An assembly as set forth in claim 3 wherein said anchor pins extend from each end of said lower horizontal frame member for selective engagement with said upper and lower retaining latches.

5. An assembly as set forth in claim 4 wherein said upper and lower retaining latches each include a latch housing and a latch member pivotally mounted within said latch housing for selective engagement with said anchor pins.

6. An assembly as set forth in claim 5 further including a biasing member interconnected between said latch housing and said latch member for continuously biasing said latch member toward a latched position disposed around said anchor pin.

7. An assembly as set forth in claim 6 wherein each of said latch members include an actuating arm for moving said latch members from said latched position to a released position.

8. An assembly as set forth in claim 7 further including a release actuator selectively engaging each of said actuating arms to lift said actuating arm and move said latch member from said latched position against said bias of said biasing member to said released position.

9. An assembly as set forth in claim 8 further including a cable extending to each release actuator to operably move said release actuator and pivot said latch member to said release position.

10. An assembly as set forth in claim 9 further including a handle mounted to said seat back frame and connected to said cable for selectively actuating said cable.

11. An assembly as set forth in claim 4 further including at least one seat belt connecting member mounted to said lower horizontal frame member for receiving seat belt loads.

12. An assembly as set forth in claim 11 wherein said lower horizontal frame member comprises a hollow tube and a tensile element disposed within and in parallel with said hollow tube and extending between opposite ends of said hollow tube thereby limiting bending of said lower horizontal frame member in response to said seat belt loads by acting in tension.

13. An assembly as set forth in claim 12 wherein said tensile element is interconnected between said anchor pins of said lower horizontal frame member.

14. An assembly as set forth in claim 2 wherein said seat cushion includes a seat cushion frame supporting a foam pad and having a rear horizontal frame member connected to a U-shaped frame member.

15. An assembly as set forth in claim 14 further including at least one seat cushion bracket mounted to said U-shaped frame member for supporting and pivoting said seat cushion independently from said seat back between a seat cushion operative position with at least a portion of said seat cushion abutting said seat back when said seat back is in said seat back operative position and a floor storing position with said seat cushion pivoting downwardly to a stowed position within the vehicle.

16. An assembly as set forth in claim 15 further including a seat cushion retaining latch mounted to the interior of the vehicle for securing said seat cushion in said seat cushion operative position.

17. An assembly as set forth in claim 16 further including retaining pins extending from each end of said rear horizontal frame member for selective engagement with said seat cushion retaining latches.

18. A retractable automotive seat assembly moveable within an interior of a vehicle between an operative position for supporting an occupant and a stowed position partially stored against a headliner of the vehicle and partially recessed within a floor of the vehicle, said assembly comprising;
a seat cushion;
a seat back adapted to be pivotally mounted to the interior of the vehicle for movement between a seat back operative position with at least a portion of said seat back abutting said seat cushion and a roof storing position with said seat back disposed above said seat cushion and adjacent the headliner; and
at least one seat cushion bracket mounted to said seat cushion for supporting and pivoting said seat cushion independently from said seat back between a seat cushion operative position, with at least a portion of said seat cushion abutting said seat back when said seat back is in said seat back operative position, and a floor storing position with said seat cushion pivoting downwardly and recessed within the floor of the vehicle.

19. An assembly as set forth in claim 18 further including a floor storage area recessed within the floor of the vehicle adapted to receive and stow said seat cushion when said seat cushion is in said floor storing position.

20. An assembly as set forth in claim 19 further including a pivotal lid mounted to the floor of the vehicle for covering the floor storage area and said seat cushion when said seat cushion is in said floor storing position.

21. An assembly as set forth in claim 18 wherein said seat cushion includes a seat cushion frame supporting a foam pad and having a rear horizontal frame member connected to a U-shaped frame member.

22. An assembly as set forth in claim 21 further including a seat cushion retaining latch mounted to the interior of the vehicle for securing said seat cushion in said seat cushion operative position.

23. An assembly as set forth in claim 22 further including retaining pins extending from each end of said rear horizontal frame member for selective engagement with said seat cushion retaining latches.

24. An assembly as set forth in claim 18 further including at least one upper retaining latch mounted to the interior of the vehicle adjacent the headliner for securing said seat back in said roof storing position disposed above said seat cushion.

25. An assembly as set forth in claim 24 further including at least one lower retaining latch mounted to the interior of the vehicle for securing said seat back in said seat back operative position abutting at least a portion of said seat cushion.

26. An assembly as set forth in claim 25 wherein said seat back includes a seat back frame supporting a foam pad and having a pair of side frame members interconnected by an upper horizontal frame member and a lower horizontal frame member.

27. An assembly as set forth in claim 26 further including anchor pins extending from each end of said lower horizontal frame member for selective engagement with said upper and lower retaining latches during said movement of said seat back between said roof storing position and said seat back operative position.

28. A method of retracting an automotive seat assembly within an interior of a vehicle between an operative position for supporting an occupant and a stowed position partially stored against a headliner of the vehicle and partially recessed within a floor of the vehicle, the seat assembly including a seat cushion and a seat back and the method comprises the steps of:
pivoting the seat back between a seat back operative position with at least a portion of the seat back abutting the seat cushion and a roof storing position with the seat back disposed above the seat cushion and adjacent the headliner; and
pivoting the seat cushion independently from the seat back between a seat cushion operative position, with at least a portion of the seat cushion abutting the seat back when the seat back is in the seat back operative position, and a floor storing position with the seat cushion pivoting downwardly and recessed within the floor of the vehicle.

29. A method as set forth in claim 28 wherein the pivoting of the seat cushion is further defined by pivoting the seat cushion from the seat cushion operative position 180° to the floor storing position which substantially positions the seat cushion upside down within the floor of the vehicle.

30. An assembly as set forth in claim 18 wherein said seat cushion bracket includes a first end mounted to said seat cushion and a second end adapted to be pivotally mounted to the interior of the vehicle with said first end being disposed below the floor of the vehicle when said seat cushion is in said floor storing position and said second end remaining above the floor of the vehicle when said seat cushion is in said floor storing position.

* * * * *